United States Patent [19]
Kuznetsov et al.

[11] Patent Number: 6,069,107
[45] Date of Patent: May 30, 2000

[54] RECHARGE CATALYST WITH THIN FILM CARBON COATING, METAL-AIR ELECTRODE INCLUDING SAID CATALYST AND METHODS FOR MAKING SAID CATALYST AND ELECTRODE

[75] Inventors: Irena Kuznetsov, Lawrenceville; Milton Neal Golovin, Marietta, both of Ga.

[73] Assignee: AER Energy Resources, Inc., Smyrna, Ga.

[21] Appl. No.: 09/098,399

[22] Filed: Jun. 17, 1998

[51] Int. Cl.$^7$ ........................................................ H01M 4/90

[52] U.S. Cl. ................ 502/101; 502/177; 502/185; 502/219; 502/221; 502/305; 502/315; 502/316; 502/325; 502/527.15; 29/623.5; 427/115; 427/249; 427/255; 429/40; 429/42; 429/44; 204/290 R; 204/294

[58] Field of Search ........................... 502/527.15, 101, 502/177, 185, 219, 221, 305, 313, 315, 316, 325; 29/623.5; 429/40, 44, 42, 101, 115, 249, 255; 204/290 R, 294

[56] References Cited

U.S. PATENT DOCUMENTS

| | | | |
|---|---|---|---|
| 3,592,695 | 7/1971 | Moran | 136/86 |
| 4,341,848 | 7/1982 | Liu et al. | 429/27 |
| 4,380,576 | 4/1983 | Yoshida et al. | 429/27 |
| 4,643,235 | 2/1987 | Schmoede et al. | 141/1.1 |
| 4,647,359 | 3/1987 | Lindstrom | 204/294 |
| 4,822,699 | 4/1989 | Wan | 429/40 |
| 4,937,220 | 6/1990 | Nickols, Jr. | 502/185 |
| 5,306,579 | 4/1994 | Shepard, Jr. et al. | 429/40 |
| 5,318,862 | 6/1994 | Liu et al. | 429/42 |
| 5,453,169 | 9/1995 | Callstrom et al. | 204/242 |
| 5,453,332 | 9/1995 | Sakairi et al. | 429/40 |
| 5,506,067 | 4/1996 | Tinker | 429/27 |
| 5,532,086 | 7/1996 | Thibault et al. | 429/245 |
| 5,563,004 | 10/1996 | Buzzelli et al. | 429/27 |
| 5,569,551 | 10/1996 | Pedicini et al. | 429/27 |
| 5,639,568 | 6/1997 | Pedicini et al. | 429/27 |

*Primary Examiner*—Bruce F. Bell
*Attorney, Agent, or Firm*—Jones & Askew, LLP

[57] ABSTRACT

A catalyst composition for use in a rechargeable metal-air electrochemical cell comprises an oxygen evolution catalyst coated with a thin film deposition of carbon. This catalyst is useful to make an air electrode which produces more power in a metal-air cell then a metal-air cell having oxygen evolution catalyst without the thin carbon film.

38 Claims, 2 Drawing Sheets

RECHARGE CATALYST WITH THIN FILM CARBON COATING, METAL-AIR ELECTRODE INCLUDING SAID CATALYST AND METHODS FOR MAKING SAID CATALYST AND ELECTRODE

TECHNICAL FIELD

This invention relates to rechargeable metal-air cells, and more particularly, relates to the composition and manufacture of an air electrode for use in a metal-air cell.

BACKGROUND OF THE INVENTION

Metal-air cells have been recognized as a desirable means by which to power portable electronic equipment such as personal computers because such cells have a relatively high power output with relatively low weight as compared to other types of electrochemical cells. Metal-air cells utilize oxygen from the ambient air as a reactant in the electrochemical process rather than a heavier material such as a metal or metallic composition.

Metal-air cells use one or more air permeable cathodes separated from a metallic anode by an aqueous electrolyte. During the operation of a metal-air cell, such as a zinc-air cell, oxygen from the ambient air is converted at the cathode to hydroxide ions and zinc is oxidized at the anode and reacts with the hydroxide ions, such that water and electrons are released to provide electrical energy.

Recently, metal-air recharging technology has advanced to the point that metal-air cells are rechargeable and are useful for multiple discharge cycles. An electronically rechargeable metal-air cell is recharged by applying voltage between the anode and the cathode of the cell and reversing the electrochemical reaction. Oxygen is discharged back to the atmosphere through the air-permeable cathode and hydrogen is vented out of the cell.

Metal-air cells may be arranged in multiple cell battery packs to provide a sufficient amount of power output for devices such as computers. An example of a metal-air power supply is found in commonly owned U.S. Pat. No. 5,354,625 to Bentz et al., entitled Metal-Air Power Supply and Air Manager System, and Metal-Air Cell for Use Therein, the disclosure of which is incorporated herein by reference.

Attempts to increase even further the power output of metal-air cells have had mixed results. Increasing the power output of a cell usually involves operating the cell at a higher current drain. Such a higher load, however, can significantly decrease the total energy density of the system and greatly increase the production of heat, both of which are detrimental to efficiency and lifetime of the cell.

Accordingly, there is a need for an increased power output from a metal-air power supply without compromising the efficiency and lifetime of the cell.

SUMMARY OF THE INVENTION

The present invention fulfills the above-described need by providing a catalyst composition for use in a rechargeable metal-air electrochemical cell comprising an oxygen evolution catalyst coated with a thin film deposition coating of carbon and an air electrode comprising such a catalyst composition. This invention also encompasses methods for making this catalyst composition and cathode. Unexpectedly, a metal-air cell including the carbon coated oxygen evolution or recharge catalyst produces more power on discharge than a comparable cell without the carbon coating. The increase in power output is particularly surprising in view of the fact that the carbon forms a thin film coating on the oxygen evolution or recharge catalyst and not the oxygen reduction or discharge catalyst.

The thin film carbon coating on the oxygen evolution catalyst desirably has a thickness from about 10 to about 100 nm, and preferably has a thickness of about 20 nm. The oxygen evolution catalyst can be coated with a thin film of carbon using a standard carbon coater normally used to prepare samples for viewing with a scanning electron microscope. On a larger scale, the thin film of carbon can be applied to the oxygen evolution catalyst with conventional thin film deposition techniques such as vacuum deposition.

A bifunctional air electrode of this invention includes the above-described carbon coated oxygen evolution catalyst. More particularly, the bifunctional air electrode of the present invention comprises an active layer comprising an oxygen reduction catalyst and an oxygen evolution catalyst. The oxygen evolution catalyst is coated with the thin layer of carbon. In addition, the bifunctional air electrode includes a current collector in electrical contact with the bifunctional electrode and a wet-proofing layer laminated to the active layer. More particularly, the active layer of the bifunctional air electrode further comprises carbon black and non-wetting agent/binder such as polytetrafluoroethylene.

Still more particularly, in a bifunctional air electrode made according to an embodiment of the present invention, the carbon coated oxygen evolution catalyst is present in an amount from about 2 to about 20% by weight of the active layer, the oxygen reduction catalyst is present in an amount from about 2 to about 20% by weight of the active layer, the carbon black is present in an amount from about 60 to about 90% by weight of the active layer, and the non-wetting agent/binder is present in an amount from about 16 to about 40% by weight of the active layer. Most particularly, in a bifunctional air electrode made according to an embodiment of the present invention, the carbon coated oxygen evolution catalyst is present in an amount of 5% by weight of the active layer, the oxygen reduction catalyst is present in an amount of 5% by weight of the active layer, the carbon black is present in an amount of 70% by weight of the active layer, and the non-wetting agent/binder is present in an amount of 20% by weight of the active layer.

The bifunctional air electrode of the present invention is made according to a process comprising admixing the oxygen reduction catalyst with the thin film carbon coated oxygen evolution catalyst to form an active layer mixture, forming a laminate comprising an active layer made with the active layer mixture and a wet-proofing layer, and positioning a current collector in electrical contact with the air electrode. The oxygen evolution catalyst is coated with the thin film of carbon before the admixing step. Still more particularly, the admixing step further comprises admixing carbon black and a non-wetting agent/binder, such as polytetrafluoroethylene, with the oxygen evolution catalyst and oxygen reduction catalyst.

Accordingly, an object of the present invention is to provide a metal-air cell with enhanced power output.

Another object of the present invention is to provide a metal-air cell with enhanced power output and a lengthy cycle life.

Other objects, features and advantages of the present invention will become apparent from the following detailed description, drawings, and claims.

DETAILED DESCRIPTION OF EMBODIMENTS OF THE INVENTION

As summarized above, this invention encompasses a catalyst composition for use in a rechargeable metal-air electrochemical cell, a method for making that catalyst composition, an air electrode comprising the catalyst composition, and a method for making the air electrode. Embodiments of this invention are described in detail below. First, a cathode made according to an embodiment of the present invention is described followed by descriptions of the method for making the catalyst composition and air electrode and a description of a metal-air cell including the air electrode of this invention.

Figure 1:
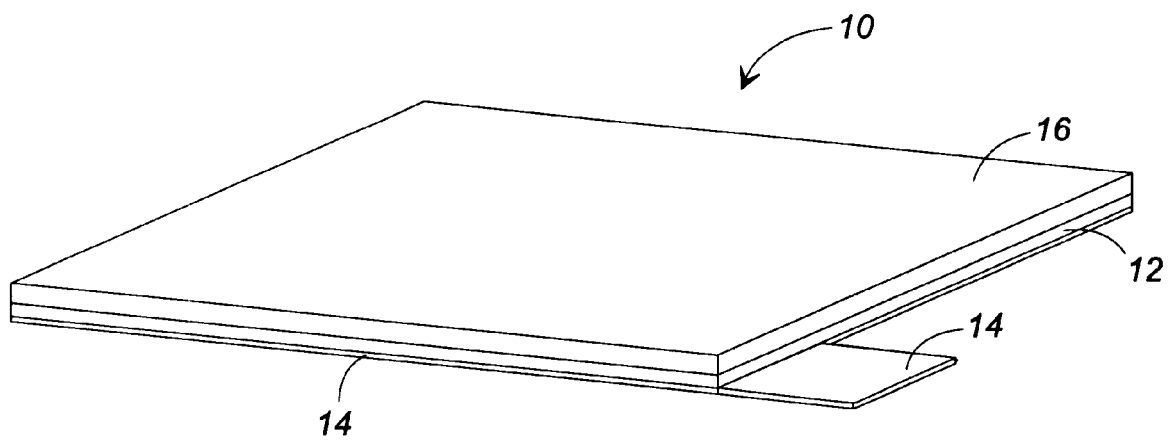
FIG. 1 is a perspective view of a bifunctional air electrode made according to an embodiment of the present invention.

Turning to FIG. 1, a bifunctional air electrode 10 made according to an embodiment of this invention is shown and comprises a wet-proofing layer 12 formed on a current collector 14 and an active layer 16 laminated to the wet-proofing layer.

Generally described, the wet-proofing layer 12 is substantially liquid-impermeable and gas permeable. The wet-proofing layer 12 preferably includes untreated carbon black, such as Shawinigan acetylene black in an amount from about 40 to about 60 percent by weight and a binding/non-wetting agent such as polytetrafluoroethylene in an amount from about 40 to about 60 percent by weight. More preferably, the wet-proofing layer comprises equal amounts of carbon black and polytetrafluoroethylene.

The current collector 14 is preferably a nickel plated screen or nickel expanded metal. Suitable current collectors are effective conductors of electric current but are inert to the electrolyte and other components of the metal-air cell in which the air electrode 10 is used.

The active layer 16 of the air electrode 10 comprises a mixture of one or more oxygen reduction catalysts, one or more oxygen evolution catalysts, a thin film deposition carbon coating on the oxygen evolution catalyst, an oxygen adsorptive particulate material, such as carbon black, and a binder/non-wetting agent. Preferably, the oxygen reduction catalyst and oxygen evolution catalyst are distributed throughout the active layer 16 of the air electrode 10.

Suitable oxygen evolution catalysts are of a type and are present in the active layer in an amount effective to evolve oxygen during recharge of a metal-air cell and carry the electrolytic reaction during recharge at a lower oxygen evolution potential than that of the oxygen reduction catalysts so that the oxygen reduction catalysts do not participate in the electrolytic recharge reaction. Suitable oxygen evolution catalysts include tungsten compounds, such as tungsten carbide (WC), tungsten carbide with 1 to 20% by weight fused cobalt, tungsten sulfide ($WS_2$), $CoWO_4$, and $FeWO_4$, and mixtures thereof. Another suitable oxygen evolution catalyst is nickel sulfide (NiS) which also protects the silver oxygen reduction catalyst. The oxygen evolution catalysts are preferably present throughout the active layer 16 of the air electrode 10 in an amount sufficient to prevent the oxygen reduction catalysts from participating in the electrolytic reaction during recharge of the cell.

The oxygen evolution catalysts desirably are first coated with a thin film of carbon prior to being mixed with the other air electrode ingredients. When added to the active layer in a sufficient amount, the thin film of carbon surprisingly enhances the power output of the metal-air cell. Thin film deposition techniques such as vacuum deposition are suitable for depositing the thin film of carbon on the oxygen evolution catalyst. The thin film of carbon has a thickness less than about 10 microns and desirably has a thickness from about 10 to about 100 nm. One method of applying this coating is to place the one or more recharge catalysts in a thin film carbon coater used for scanning electron microscope work using a graphite carbon source. In such a carbon coater, the oxygen evolution catalyst is placed in a chamber with the graphite carbon source which explodes when electric current is directed through the graphite carbon. The exploded graphite carbon forms a thin film of carbon on the oxygen evolution catalyst. On a larger scale, the thin film deposition of carbon can be applied by vacuum deposition techniques such as that used to coat semiconductors. The Handbook of Thin-Film Deposition Processes and Techniques (Noyes Pubs. 1988; Schuegraf, K. K. editor) provides a broad review of thin-film deposition techniques.

Suitable oxygen reduction catalysts are of a type and are present in an amount effective to produce a satisfactory level of current on the first and subsequent discharge cycles of the metal-air cell in which the air electrode is used. Suitable oxygen reduction catalysts include silver, cobalt oxides or spinels having the formula $Co_xO_y$, transition metal macrocyclics such as cobalt tetramethoxyphenylporphyrin (CoTMPP), spinels, and perovskites such as lanthanum/nickel/cobalt oxide ($LaNi_{1-x}CO_xO_y$) or lanthanum/iron/cobalt oxide ($LaFe_{1-x}CO_xO_y$), and mixtures thereof.

The oxygen absorptive particles in the active layer 16 of the air electrode 10 are preferably carbon black. Suitable carbon black has a surface area greater than 60 square meters per gram. Desirably, the carbon black is a fluffy form of carbon black comprising discreet particles in a chain-like structure, such as Shawinigan AB-50 acetylene black available from Chevron Chemical Company. Suitable binder/non-wetting agents include polytetrafluoroethylene (Teflon).

The relative amounts of the components of the active layer 16 may vary. Preferably, however, the carbon coated oxygen evolution catalyst is present in the active layer 16 of the air electrode 10 in a total amount from about 2 to about 20 percent by weight of the active layer, the oxygen reduction catalyst is present in the active layer in a total amount from about 2 to about 20 percent by weight of the active layer, the carbon black is present in an amount from about 60 to about 90 percent by weight of the active layer, and the polytetrafluoroethylene is present in the active layer in a total amount from about 16 to about 40 percent by weight of the active layer. Preferably, the carbon coated oxygen evolution catalyst is present in an amount of 5% by weight of the active layer, the oxygen reduction catalyst is present in an amount of 5% by weight of the active layer, the carbon black is present in an amount of 70% by weight of the active layer, and the non-wetting agent/binder is present in an amount of 20% by weight of the active layer.

The bifunctional air electrode 10 can be made by conventional methods known to those skilled in the art such as filtration using methanol or water or both as a solvent and the wet paste method using methanol or water as a solvent. U.S. Pat. No. 4,152,489 discloses a suitable wet paste method and the disclosure of such patent is expressly incorporated herein by reference. Desirably, however, the air electrode is made by a dry press method described in Example 1 hereinbelow.

Figure 2:
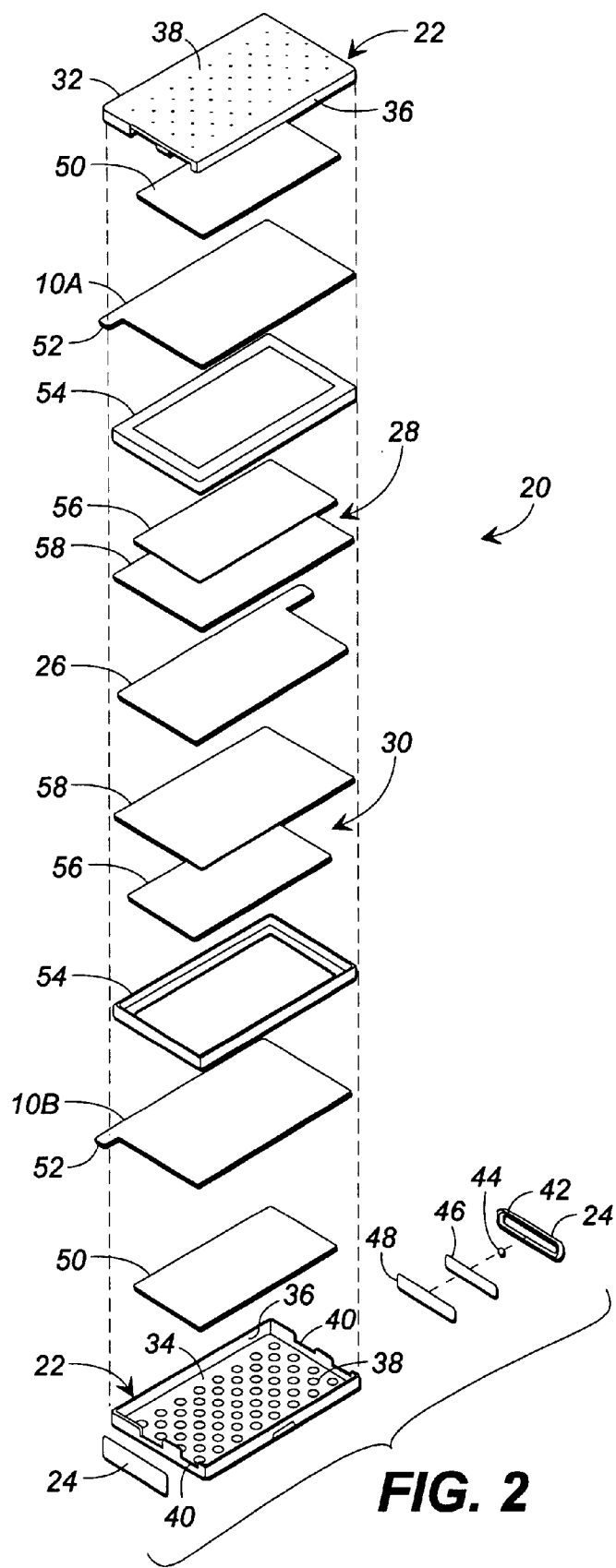
FIG. 2 is an exploded view of the elements of a metal-air cell including a pair of bifunctional air electrodes such as the electrode illustrated in FIG. 1.

Turning to FIG. 2, a zinc-air cell 20 is illustrated in exploded view and includes a pair of air electrodes 10A and 10B having the same structure as the air electrode 10 as illustrated in FIG. 1 and described above. Generally described, the zinc-air cell 20 comprises a cell casing 22, one or more vent caps 24, a dual anode 26, and a pair of separators 28 and 30. The cell case 22 is filled with aqueous electrolyte. Although the metal-air cell 20 described herein is a zinc-air cell, it should be understood that the recharge catalyst composition and air electrode of the present invention is applicable to other types of metal-air cells.

The cell case 22 is a multi-piece structure comprising a first air electrode mask wall 32, a second air electrode mask wall 34 opposite the first air electrode mask wall, and a plurality of side walls 36 connecting the first and second mask walls so as to form a prismatic cell case. The cell case 22 is desirably molded from a lightweight plastic, such as polypropylene, which is inert to the electrolyte in the cell case. The respective elements of the cell case 22 are sealed together with a hot melt process or other sealing method.

Each air electrode mask wall 32 and 34 has a plurality of conically-shaped openings 38 to allow air flow or diffusion through the cell case 22 to the air electrodes 10A and 10B of the cell 20. The air openings 38 are desirably evenly spaced across the respective mask walls 32 and 34. The size, number, and shape of air openings 38 in the mask walls 32 and 34 are selected such that sufficient oxygen reaches the air electrodes 10A and 10B through the mask walls to generate the desired current from the cell while preventing excessive moisture transfer into or out of the cell 20 through the mask walls. In addition, the size, number, and shape of the openings 38 and the mask walls 32 and 34 is such that sufficient lateral distribution of oxygen through to the cell is achieved while the thickness of the cell is minimized. Suitable size, number, and shape of the air openings 38 vary depending on the size and use of the cell; however, a suitable arrangement is disclosed in U.S. Pat. No. 5,629,568, the disclosure of which is expressly incorporated herein by reference.

The side walls 36 of the cell case 22 define one or more apertures 40 for venting gas from the cell and filling the cell 20 with electrolyte. These vent apertures are sealed with the vent caps 24 which are desirably constructed of a lightweight plastic such as polypropylene like the remainder of the cell case. Each vent cap 24 defines one or more gas exit holes 42 and is surrounded by a small recess in the interior of the vent cap. This recess is filled with a secondary vent seal 44 via ultrasonic welding or other bonding means. The secondary vent seal 44 is desirably a hydrophobic, gas permeable membrane, such a polypropylene membrane available from Hoechst Celanese Corporation of Charlotte, N.C. under the trademark CELGARD 4599. A vent diffusion membrane 46 fits over the secondary vent seal 44 within the vent caps 24 and is desirably a polyvinyl acetate material such as dexter 7487 polyvinyl acetate material available from Dexter Corporation of Windsor-Locks, Conn. or Porex polyethylene material available from Porex Technologies, of Fairbum, Ga. The vent diffusion membrane is in turn covered with a primary vent seal 48 which is desirably a microporous Teflon film. The vent diffusion membrane 46 and the vent seal 48 are desirably attached to the vent cap 24 with adhesives or other bonding methods. The vent caps 24 can also include a plastic vent support frame (not shown) for holding the vent caps in place. A similar vent structure is described in U.S. Pat. No. 5,362,577, the disclosure of which is expressly incorporated herein by reference in its entirety.

The elements of the cell 20 illustrated in FIG. 2 are assembled in sandwich style. The interior surfaces of the air electrode mask walls 32 and 34 are covered with a layer of absorbent diaper material 50 which is desirably a layer of polyacrylic acetate. The absorbent diaper material 50 is attached to the respective mask walls 32 and 34 with adhesive and other bonding means. The absorbent diaper 50 absorbs any electrolyte that might otherwise leak from the cell through the air openings 38 in the mask walls 32 and 34. The absorbent diaper 50 also assists in the lateral diffusion of ambient air that enters through the mask walls and travels to the air electrodes 10A and 10B.

The first and second air electrodes 10A and 10B are disposed in the cell case 22 against respective first and second mask walls 32 and 34 with the absorbent diaper material 50 between each air electrode and the adjacent mask wall. The wet-proofing layer 12 of each air electrode 10A and 10B faces the adjacent mask wall 32 or 34 and the active layer 16 of each air electrode faces the interior of the cell 20. Each air electrode 10A and 10B has a terminal tab extending out of the casing 20 through respective recesses and the casing side walls 36 to provide negative terminals for the cell.

The air electrodes 10A and 10B are held in place in the cell by the application of adhesives or other bonding methods. In addition, the air electrodes 10A and 10B are further held in place adjacent to the respective mask walls 32 and 34 by respective support frames 54 which, likewise, are held in place by the application of adhesives or other bonding methods. The cathode support frames 54 are made of plastic such as polyethylene and extend about the side walls 36 of the cell case 22. Each support frame 54 has a large central opening so as not to cover the respective air electrode 10A and 10B. The support frames 54 provide structural strength to the cell 20 and prevent electrolyte from leaking around the edges of the air electrodes 10A and 10B and out of the cell 20.

The active layers 16 of the air electrodes 10A and 10B are covered with the first and second separator layers 28 and 30. Each separator layer 28 and 30 comprises a layer of an absorbent fibrous web 56 and a layer of a microporous membrane 58 that, when wet, is gas-impermeable and liquid-permeable. A suitable absorbent fibrous web 56 comprises nylon such as that sold by Hollinsworth and Vose under the designation TR1113H, while a desired microporous membrane 58 comprises a polypropylene membrane such as that sold under the name CELGARD 5511 by Hoechst Celanese Corporation of Charlotte, N.C. The separator layers 28 and 30 are attached to the air electrodes 10A and 10B and the respective support frames 54 by adhesives or other bonding methods.

The anode 26 is disposed in the cell 20 between the first and second separator layers 28 and 30. A suitable anode includes a layer of zinc attached to a current collector. The zinc can be zinc or zinc alloy metal sheet or can be a zinc powder cake. Desirably, the anode 26 is wrapped in an anode bag made of a layer of absorbent fibrous material and a layer of microporous membrane which is gas-impermeable and liquid-permeable when wet. A suitable absorbent fibrous web material is nylon sold by Hollinsworth and Vose under the designation TR1113G and a suitable microporous membrane for the anode bag is CELGARD 5511. A particularly suitable anode is a "split" anode assembly as disclosed in U.S. Pat. No. 5,639,568, the disclosure of which is already incorporated herein by reference.

After the anode 26 is in place, the side walls 36 of the casing are heat sealed together to enclose the cell 20. Likewise, the vent caps 24 are sealed. Liquid electrolyte is then poured into the cell casing and is substantially absorbed by the fibrous webs and microporous membranes of the separator layers 28 and 30 and the anode. The cell case 22 is then completely sealed.

Suitable electrolyte is aqueous base electrolyte including a Group I metal hydroxide. Examples include LiOH, NaOH, KOH, CsOH, or the like.

During operation of the cells 20, air enters through the openings 38 in the mask walls 32 and 34 and penetrates the layers of the air electrodes 10A and 10B. At the air electrodes 10A and 10B, oxygen from the ambient air initiates an electrolytic reaction that results in the production of current from the cell 20. The transfer of ions between the anode 26 and the air electrodes 10A and 10B is accomplished through the electrolyte absorbed in the separator layers 28 and 30 and the separator bag of the anode 26. When the materials are wet, the ions pass through the microporous membranes and fibrous webs in the cell.

The microporous membranes in the separator layers 28 and 30 and the anode bag limit the growth of dendrites on the zinc anode 26 and prevents the dendrites from growing from the anode to the air electrodes 10A and 10B. Any contact between zinc dendrites from the anode 26 and the air electrodes 10A and 10B short circuits the cell 20. The microporous membranes maintain zinc oxide generated at the anode 26 in intimate contact with the anode.

The microporous membranes in the separator layers 28 and 30 and the anode bag also prevent oxygen gas from reaching the anode and self discharging the cell. Oxygen is allowed to reach the anode only in solution.

The absorbent fibrous webs of the separator layers 28 and 30 and the anode bag absorb substantially all of the electrolyte and trap the electrolyte in place between the anode 26 and the air electrodes 10A and 10B so that the cell 20 can operate in any orientation.

Surprisingly, as illustrated by the following example, the deposition of the thin film carbon coating on the oxygen evolution catalyst in the present invention increases the power output of metal-air cells containing such carbon treated oxygen evolution catalyst. This is particularly surprising because the carbon is associated with the oxygen evolution catalyst and not the oxygen reduction catalyst which catalyzes the discharge reaction.

The following Example 1 is designed to disclose a particular embodiment of the present invention and teach one of ordinary skill in the art how to carry out the present invention.

EXAMPLE 1

A charge catalyst package comprising 0.5 grams of NiS, 0.5 grams of FeWO$_4$, and 0.5 grams of WC with 12% Co was mixed together and placed in a Cressington carbon coater for use in treating samples to be viewed through a scanning electron microscope. The carbon coater was charged with graphitic carbon and closed. The carbon was disintegrated with an electric pulse and the charge package remained in the carbon coater for 16 seconds after the graphitic carbon was disintegrated.

A bifunctional electrode was made by the dry press method which comprises pressing a dry wet-proofing layer mixture against a current collector followed by pressing a dry active layer mixture against the wet-proofing layer to complete the laminate.

The wet-proofing layer mixture was formed by first mixing 30 grams of Shawinigan AB50 acetylene carbon black with 70 milliliters of distilled water for 20 minutes. This mixture was mixed in a Kitchenaid baking type mixer with a dough (anchor shape) agitator on speed 2. 130 milliliters of distilled water were added to the composition which was mixed for an additional 10 minutes. Separately, 18 grams of Teflon 30 having a pH of at least 10 was mixed with 125 milliliters of distilled water and added to the wet-proofing mixture which was then mixed for an additional 40 seconds. The wet-proofing mixture was dried in a convection oven over 20 hours at a temperature of 100° C. The dried mixture was then chopped in a kitchen-type Osterizer blender at crumb setting to a particle size of 180–300 microns.

An active layer mixture was also formed in a Kitchenaid baking type mixer with a dough agitator on speed 2. 17 grams of Shawinigan AB50 carbon black was mixed for 10 minutes with 0.5 grams of WC with 12% Co, 0.5 grams of FeWO$_4$, and 0.54 grams NiS, all of which catalyst were previously coated with a thin film deposition coating of carbon as described above. Next, a mixture of 2 grams of AgNO$_3$ and 60 milliliters of distilled water were added to the active layer mixture and mixed for 10 minutes. An additional 50 milliliters of distilled water were added to the composition which was then mixed for an additional 10 minutes. A mixture of 6 grams of Teflon 30B having a pH of at least 10 and 50 milliliters of distilled water was added to the active layer mixture which is mixed for an additional 35 seconds. The resulting active layer mixture was then dried for over 20 hours in a convection oven at 100° C. The dried active layer mixture was then chopped to a particle size of about 180 microns in a kitchen-type Osterizer blender at crumb setting.

The bifunctional air electrode was formed by spreading 4.3 grams of the dry wet-proofing layer mixture on an expanded nickel current collector having dimensions 7.6 cm by 14 cm. The current collector was rinsed with MeOH prior to the wet-proofing layer being added to the current collector. The wet-proofing layer mixture and current collector were wrapped in stainless steel foil type 321 and placed between the plates of a hot hydraulic press. The current collector and wet-proofing layer were then pressed for 15 minutes at 400° F. and 9000 psig. 1.9 grams of the dry active layer mixture was then spread on top of the wet-proofing layer and the entire electrode was cold pressed for ten minutes at 2000 psig followed by hot pressing for 15 minutes at 560° F. and 8000 psig.

Two air electrodes made in accordance with this Example 1 were incorporated into a zinc-air cell having the construction described above and illustrated in FIG. 2. The cell was a 132/20 cell and produced 3.88 watts at a 4 amp pulse having a 5 minute pulse width. A comparable cell having the same structure but without the thin film of carbon on the recharge catalyst had a power output of 3.36 watts. Accordingly, the cell of this Example 1 produced 15.5% more power than a comparative conventional cell.

It should be understood that the foregoing relates to preferred embodiments of the present invention and that numerous changes may be made therein without departing from the scope of the invention as defined by the following claims.

We claim:

1. Catalyst composition for use in a rechargeable metal-air electrochemical cell comprising an oxygen evolution catalyst coated with a thin film deposition coating of carbon, wherein the thin film of carbon has a thickness less than about 10 microns.

2. Catalyst composition as in claim 1 wherein the thin film of carbon has a thickness from about 10 to about 100 nm.

3. Catalyst composition as in claim 1 wherein the oxygen evolution catalyst comprises a tungsten compound.

4. Catalyst composition as in claim 1 wherein the oxygen evolution catalyst is selected from the group consisting of WC, $FeWO_4$, $WS_2$, WC with 1 to 20 percent fused Co, and NiS.

5. Catalyst composition as in claim 1 wherein the oxygen evolution catalyst comprises $FeWO_4$, WC with 1 to 20 percent fused Co, and NiS.

6. Method for making a catalyst composition for use in a rechargeable metal-air electrochemical cell comprising depositing a thin film coating of carbon on an oxygen evolution catalyst, wherein the thin film of carbon has a thickness less than about 10 microns.

7. Method as in claim 6 wherein the thin film carbon coating has a thickness from about 10 to about 100 nm.

8. Method as in claim 6 wherein the oxygen evolution catalyst comprises a tungsten compound.

9. Method as in claim 6 wherein the oxygen evolution catalyst is selected from the group consisting of WC, $FeWO_4$, $WS_2$, WC with 1 to 20 percent fused Co, and NiS.

10. Method as in claim 6 wherein the oxygen evolution catalyst comprises $FeWO_4$, WC with 1 to 20 percent fused Co, and NiS.

11. A bifunctional air electrode for use in a rechargeable metal-air electrochemical cell comprising:
    an active layer comprising an oxygen reduction catalyst and an oxygen evolution catalyst, the oxygen evolution catalyst being coated with a thin film deposition coating of carbon, wherein the thin film of carbon has a thickness less than about 10 microns;
    a wet-proofing layer laminated to the active layer to form a laminate; and
    a current collector in electrical contact with the laminate.

12. A bifunctional air electrode as in claim 11 wherein the thin film coating of carbon has a thickness from about 10 to about 100 nm.

13. A bifunctional air electrode as in claim 11 wherein the oxygen evolution catalyst comprises a tungsten compound.

14. A bifunctional air electrode as in claim 11 wherein the oxygen evolution catalyst is selected from the group consisting of WC, $FeWO_4$, $WS_2$, WC with 1 to 20 percent fused Co, and NiS.

15. A bifunctional air electrode as in claim 11 wherein the oxygen evolution catalyst comprises $FeWO_4$, WC with 1 to 20 percent fused Co, and NiS.

16. A bifunctional air electrode as in claim 11 wherein the active layer further comprises carbon black and a non-wetting agent/binder.

17. A bifunctional air electrode as in claim 16 wherein the oxygen evolution catalyst is present in an amount from about 2 to about 20% by weight of the active layer, the thin film carbon coating has a thickness from about 10 to about 100 nm, the oxygen reduction catalyst is present in an amount from about 2 to about 20% by weight of the active layer, the carbon black is present in an amount from about 60 to about 90% by weight of the active layer, and the non-wetting agent/binder is present in an amount from about 16 to about 40% by weight of the active layer.

18. A bifunctional air electrode as in claim 16 wherein the non-wetting agent/binder is polytetrafluoroethylene.

19. Method for making a bifunctional air electrode for use in a rechargeable metal-air electrochemical cell comprising the steps of:
    coating an oxygen evolution catalyst with a thin film deposition coating of carbon, wherein the thin film of carbon has a thickness less than about 10 microns;
    admixing an oxygen reduction catalyst and the coated oxygen evolution catalyst to form an active layer mixture;
    forming a laminate comprising a wet-proofing layer and an active layer, the active layer formed with the active layer mixture; and
    positioning a current collector in electrical contact with the laminate.

20. Method as in claim 19 wherein the thin film coating of carbon has a thickness from about 10 to about 100 nm.

21. Method as in claim 19 wherein the oxygen evolution catalyst comprises a tungsten compound.

22. Method as in claim 19 wherein the oxygen evolution catalyst is selected from the group consisting of WC, $FeWO_4$, $WS_2$, WC with 1 to 20 percent fused Co, and NiS.

23. Method as in claim 19 wherein the oxygen evolution catalyst comprises $FeWO_4$, WC with 1 to 20 percent fused Co, and NiS.

24. Method as in claim 19 wherein the admixing step further comprises admixing carbon black and a non-wetting agent/binder with the oxygen evolution catalyst and the oxygen reduction catalyst.

25. Method as in claim 24 wherein the oxygen evolution catalyst is present in an amount from about 2 to about 20% by weight of the active layer, the thin film carbon coating has a thickness from about 10 to about 100 nm, the oxygen reduction catalyst is present in an amount from about 2 to about 20% by weight of the active layer, the carbon black is present in an amount from about 60 to about 90% by weight of the active layer, and the non-wetting agent/binder is present in an amount from about 16 to about 40% by weight of the active layer.

26. Method as in claim 24 wherein the non-wetting agent/binder is polytetrafluoroethylene.

27. Catalyst composition for use in a rechargeable metal-air electrochemical cell comprising an oxygen evolution catalyst coated with a thin film deposition coating consisting essentially of carbon.

28. Catalyst composition as in claim 27 wherein the oxygen evolution catalyst comprises a tungsten compound.

29. Catalyst composition as in claim 27 wherein the oxygen evolution catalyst is selected from the group consisting of WC, $FeWO_4$, $WS_2$, WC with 1 to 20 percent fused Co, and NiS.

30. Method for making a catalyst composition for use in a rechargeable metal-air electrochemical cell comprising depositing a thin film coating consisting essentially of carbon on an oxygen evolution catalyst.

31. Method as in claim 30 wherein the oxygen evolution catalyst comprises a tungsten compound.

32. Method as in claim 30 wherein the oxygen evolution catalyst is selected from the group consisting of WC, $FeWO_4$, $WS_2$, WC with 1 to 20 percent fused Co, and NiS.

33. A bifunctional air electrode for use in a rechargeable metal-air electrochemical cell comprising:
    an active layer comprising an oxygen reduction catalyst and an oxygen evolution catalyst, the oxygen evolution catalyst being coated with a thin film deposition coating consisting essentially of carbon;
    a wet-proofing layer laminated to the active layer to form a laminate; and
    a current collector in electrical contact with the laminate.

34. A bifunctional air electrode as in claim 33 wherein the oxygen evolution catalyst comprises a tungsten compound.

35. A bifunctional air electrode as in claim 33 wherein the oxygen evolution catalyst is selected from the group consisting of WC, $FeWO_4$, $WS_2$, WC with 1 to 20 percent fused Co, and NiS.

36. Method for making a bifunctional air electrode for use in a rechargeable metal-air electrochemical cell comprising the steps of:

coating an oxygen evolution catalyst with a thin film deposition coating consisting essentially of carbon;

admixing an oxygen reduction catalyst and the coated oxygen evolution catalyst to form an active layer mixture;

forming a laminate comprising a wet-proofing layer and an active layer, the active layer formed with the active layer mixture; and positioning a current collector in electrical contact with the laminate.

37. Method as in claim 36 wherein the oxygen evolution catalyst comprises a tungsten compound.

38. Method as in claim 36 wherein the oxygen evolution catalyst is selected from the group consisting of WC, $FeWO_4$, $WS_2$, WC with 1 to 20 percent fused Co, and NiS.

* * * * *